April 2, 1929.  B. F. OISHEI  1,707,681
COMBINED CIGAR LIGHTER AND WINDSHIELD HEATER
Filed April 29, 1927
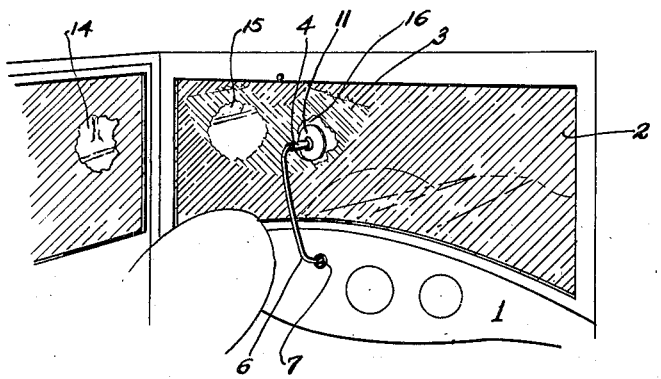
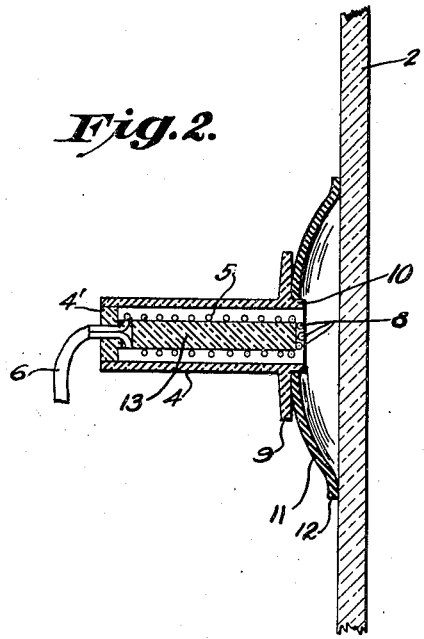
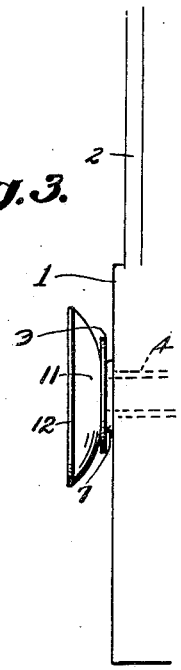
Inventor
Bernard F. Oishei
Bartai A. Bean Jr
Atty.

Patented Apr. 2, 1929.

1,707,681

UNITED STATES PATENT OFFICE.

BERNARD F. OISHEI, OF BUFFALO, NEW YORK, ASSIGNOR TO TRICO PRODUCTS CORPORATION, OF BUFFALO, NEW YORK.

COMBINED CIGAR LIGHTER AND WINDSHIELD HEATER.

Application filed April 29, 1927. Serial No. 187,653.

This invention relates to a combined cigar or cigarette lighter and windshield heater, and in its latter capacity it is designed to heat the glass from within a motor vehicle so as to cause the frozen or congealed moisture on the outer glass surface to melt or partially melt sufficiently to effect a removal thereof, either by gravity, with or without the assistance of the wind pressure created by the moving vehicle, or by mechanical means such as a windshield cleaner. The invention is especially adapted for cooperating with an automatic windshield cleaner by loosening the frozen particles found in the effective area of the cleaner.

It not infrequently happens that a motorist will encounter climatic conditions during his winter travel in which snow, rain, or mist will accumulate on the windshield and become frozen thereon to such an extent that the car-equipped windshield cleaner will fail to remove the frozen material from the field of vision of the driver. Driving under such conditions is not only annoying to the driver but is also dangerous, and realizing the fact that his vision is obstructed he frequently attempts to assist the wiper by placing the palm of his hand against the inner surface of the windshield glass for a short interval during which the heat from his hand softens or melts the coating at the point where it is adhering to the exterior surface of the glass, following which the windshield wiper will remove that immediate portion from the field of vision and thereby permit the driver to have a restricted view through the uncoated portion of the windshield. Such tactics not only remove one hand of the driver from a complete control of the car but also obscure a considerable portion of his view as well as cause him to move forward in his seat into an abnormal position in order to better reach the windshield, from which position it is also difficult to have proper control of the car.

Automobile manufacturers are now equipping their automobiles with different electrical equipment for the convenience of the motorist, and in this added equipment is frequently included a cigar lighter which is mounted on the end of a wire cord which may be withdrawn from a reel, behind the instrument board, to bring the cigar lighter to a convenient position for enabling the driver to light his cigar. At other intervals the cigar lighter is idle and remains inoperative on the instrument board.

The present invention has for an object to utilize the cigar lighter in other capacities, namely, for heating the windshield to melt an icy coating on the exterior thereof. It further has for an object to provide a combined lighter and heater from which the driver may readily light his cigar or cigarette without interference or without obstruction because of the added presence of any of the windshield heater construction. A still further object of the invention is to provide a combined cigar lighter and windshield heater in which the cigar lighter is equipped with means for confining and directing the generated heat to a definite and particular portion of the windshield; and the invention also has for an object to provide such means in the form of a rubber suction cup by which the heater may be adhesively secured to a desired portion of the windshield so as to leave the driver free to use both of his hands in the control of his machine.

The invention further resides in the features of the construction and the arrangements and combinations of parts hereinafter described in detail and set forth in the appended claims, reference being made to the accompanying drawing wherein Figure 1 is a fragmentary perspective view of the interior of a closed car or automobile depicting the present invention functioning in its capacity as a windshield heater.

Figure 2 is a sectional view through the combined lighter and heater showing its application to the windshield.

Figure 3 is an elevation of the device in its normal or inoperative position on the instrument board.

Proceeding in accordance with the present invention the numeral 1 designates the instrument board of an automobile above which is arranged the windshield 2, which is shown in a manner to indicate a clouded or coated exterior surface of frozen or congealed moisture which obscures the vision therethrough. The shaded portion 3 indicates the path of travel of a windshield cleaner, such as the automatic or motor operated type, which is also coated with ice so as to obscure the driver's vision through this comparatively restricted area which constitutes his immediate field of vision.

The combined lighter and heater preferably comprises a body 4 of insulating material shaped to provide a convenient hand grip in which is disposed the electrical resistance unit 5 which is electrically connected to the storage battery by a flexible cord 6. This cord when released is automatically retracted within the instrument board through the socket 7, as by means of a self-winding reel, and when pulled outwardly it automatically connects the resistance element 5 to the source of electrical energy for rendering incandescent the exposed coils 8 from which the driver can light his cigar or cigarette. The automatic connecting and breaking of the electric circuit may be accomplished in the manner now in vogue and which does not need special elaboration here. To limit the retractile movement of the body 4 into the socket 7, said body 4 is provided with an annular flange 9 which is set backwardly or inwardly from the free end of the body 4, the projecting end forming an annular shoulder 10. Seating on this annular shoulder 10 is a cup or skirt 11, the marginal portion 12 of which is designed to flatly rest against the windshield glass and thereby confine the heat radiated to the included portion of the glass. This cup is preferably of a resilient or yielding material such as rubber, and when pressed against the glass and released will firmly secure the device in its set position through the suction thus set up. The cup may be suitably cemented about the shoulder 10 if desired, and the stop flange 9 is preferably of such diameter as to extend outwardly over the convex face of the cup a considerable distance so as to lend reinforcement thereto, when pressing or applying the device against the windshield. By reason of the broad flange a considerable portion of the cup will be flattened out, or partially so, when pressing the device against the glass so as to more fully expel the air from within the cup, and thereby provide a more efficient suction gripping of the marginal portion 12 on the glass.

The cigar lighter may be of any preferred form with the outer end 4' of the body 4 rendered airtight. In the preferred embodiment the resistance element is somewhat enlarged, having the coils thereof extending into the body 4 over a core 13 for generating an additional amount of heat which quickly radiates and passes out through the open end of the body into the cup 11, where it is trapped or confined by the cup to the immediate area of the windshield glass covered thereby. This effects a rapid heating of the covered area of the glass, and a more or less tapering off of the temperature beyond the marginal portion 12 so that the icy coating is quickly loosened from the glass regardless of whether the exterior surface of the icy coating is brought to a thawing temperature or not. This heating and loosening of the hold which the icy coating has on the glass is sufficient to permit the congealed matter to gravitate away from the heated zone regardless of the further assistance of any mechanical device. Such a cleared area is indicated at 14 which is on a side window of the vehicle and in this connection it may be noted that the term "windshield" obviously includes any glazed opening subject to an icy coating. Such gravitation of the loosened congealed material will be expedited by the wind pressure created by the moving vehicle against the same. When the device is applied to the glass in the path of a windshield wiper, the abrasive or rubbing action of the wiper on the icy coating will very quickly remove the same after a very short application of the heater to the inside of the windshield. By confining the heat with the cup to a particular area of the windshield, its intensity is increased and only a short application is required before the heat radiates beyond the marginal lines of the device so as to loosen a much larger area for the wiper to clear away, such an enlarged area being indicated at 15. After the device has been applied to one portion of the windshield for a sufficient time to clarify the view therethrough it may be removed and affixed to an adjacent or another portion of the windshield, as at 16, so as to enlarge the field of vision. The displacement and application of the device from and to the windshield is very easily accomplished, and will not distract the attention of the driver or remove his hand from the control of the machine but for a moment, and the device will remain operative until the vacuum within the cup is broken by the operator. After being removed from the windshield and released the cord will automatically be withdrawn through the socket 7 and hold the flange 9 against the outer edge of said socket, the electric current being cut off in such withdrawn position.

In an open car the cup will additionally function as a guard to protect the cigar-lighting contact from the wind, and will operate in an open car as efficiently as in a closed car in loosening the icy layer on the windshield.

With the collapsible nature of the cup it is possible to adjust or vary the distance from the heater 5, 8 to the windshield and thereby vary the intensity of the action of the heater on the icy coating.

I claim:—

1. A combined cigar lighter and windshield heater comprising a hollow body open at one end, a resistance element arranged within the body and adapted for electrical connection to a source of electrical energy, said resistance element being accessible through the open end of the body for the purpose of lighting a cigar, and resilient means about the open end of the body for directing and confining the heat generated by the resistance element to a definite area when applied against a windshield or window.

2. In combination with an electrical cigar lighter accessory of an automobile, a collapsible skirt about the active portion of the accessory for confining the generated heat to a definite area, the collapsibility of the skirt permitting adjustment of the lighter toward and from the windshield glass to which the skirt is applied.

3. An automobile accessory comprising a body including a suction cup by which the body may be adhesively attached to the windshield of a motor vehicle, and an electrical resistance unit for generating heat within the cup.

4. An automobile accessory comprising a hollow tubular body open at one end and closed at its opposite end, a suction cup secured about the open end of said body with the body opening into the cup, and an electrical resistance unit arranged in the body for generating heat to pass into the cup, a portion of said resistance unit being exposed through the open end of the body to function as a cigar lighter, and another portion of said resistance unit being arranged rearwardly within the tubular body, inaccessible as a cigar lighter, for functioning solely as a heater.

5. An automobile accessory comprising a hollow tubular body open at one end, a suction cup secured about the open end of said body, an electrical resistance unit arranged in the body for generating heat to pass into the cup, and a peripheral flange on the body adjacent the cup for overhanging and engaging the latter to effect a more rapid expulsion of the air from the cup in applying the latter to a surface.

6. An automobile accessory comprising a hollow, tubular body open at one end and closed at the opposite end, an electrical resistance unit arranged in the body and having one portion thereof exposed through the open end of the body to function as a cigar lighter and the remaining portion of the resistance unit disposed rearwardly from the open end within the body, and a heat-confining skirt about the open end of the body and into which said body opens, said skirt functioning to confine the heat emanating from the open end of the body, as generated by both portions of said resistance unit, when positioned against a surface.

7. An electric heater for windshields, comprising a movable body, a resistance unit carried thereby for directing its heat against the windshield, said body being movable from an inoperative position to an operative position, and means for connecting the resistance unit to a source of electrical energy to effect energization of said unit, said means being operable by and during movement of the body from an inoperative position to an operative position.

8. An electric heater for windshields, comprising a movable body, movable from an inoperative to an operative position, a resistance unit carried by the body for directing its generated heat against the windshield when the body is in its operative position, an electric cord connected to the heater and connectible to a source of electric energy, means for paying out the electric cord as the body is moved from its inoperative to its operative position and for taking up said cord when said body is returned from its operative position to its inoperative position, and means for connecting said cord electrically to a source of energy by and during movement of the body from its inoperative to its operative position.

BERNARD F. OISHEI.